May 7, 1968   B. ASSOW ETAL   3,382,409
OVERCURRENT-AND OVERVOLTAGE-PROTECTION ARRANGEMENT
Filed May 11, 1966
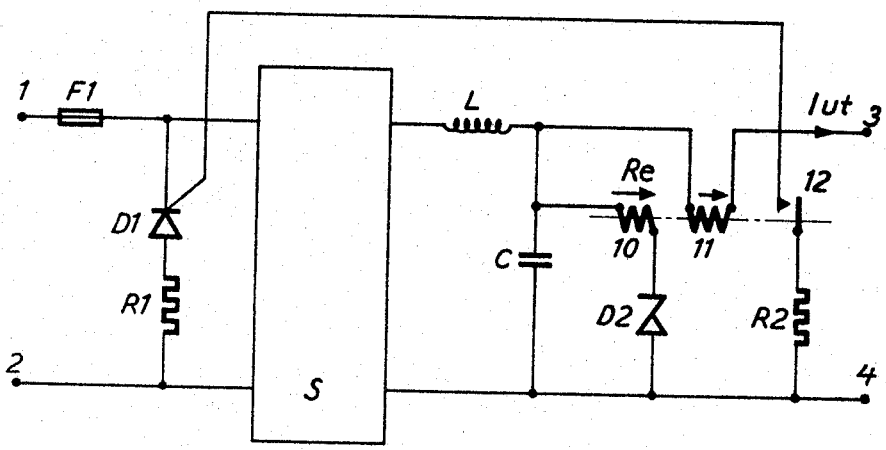
INVENTOR.
BENGT HOLGER ASSOW
ROLF HUBERT GUSTAFSSON
BY Hame and Nydick
ATTORNEYS

3,382,409
OVERCURRENT- AND OVERVOLTAGE-PROTECTION ARRANGEMENT

Bengt Assow, Wellington, North Island, New Zealand, and Rolf Gustafsson, Huddinge, Sweden, assignors to Telefonaktiebolaget L.M. Ericsson, Stockholm, Sweden, a corporation of Sweden
Filed May 11, 1966, Ser. No. 549,394
1 Claim. (Cl. 317—16)

The present invention refers to an arrangement for protection against overcurrents and overvoltages at a power regulator, at which a filter of low pass kind, with an inductance coil in the series branch and a capacitor in the parallel branch, is connected to the output of the regulator.

For an effective overcurrent and overvoltage protection it is to be required that its construction should be simple, and that it should be so fast in its function that it has time enough to break an overcurrent or an overvoltage before it has got values dangerous to the components in the arrangement for which the protection is intended. At for example regulators for high currents it is difficult to obtain a short-circuit protection with merely semiconductors elements. Then a series resistance has to be used, in which losses occur, and over which for example by means of a transistor a supervision takes place. Conventional relays and other electromagnetic instruments are not suitable, on account of the fact that they are too slow, so that the components that are supposed to be protected get ruined before the current has been broken.

The present invention is intended to get an arrangement by means of which a reliable protection against overcurrents and overvoltages, fed by direct current pulses in a regulator arrangement, is obtained.

The arrangement is characterized thereby that a relay of preferably a reed relay kind, provided with a current winding and a voltage winding, is connected between the low pass filter of the output of the regulator and the output terminals of the arrangement, at which the current winding is connected between the connection point between the capacitor and the coil of the filter and the corresponding output terminal, and the voltage winding is connected in series with a Zener diode between said connection point and the corresponding other output terminal, and that a resistance and a controlled rectifier are connected in series to the input terminals of the regulator, the controlled rectifier having its ignition electrode, in series with a make contact of said relay, connected with said second output terminal clip, at which the relay is dimensioned in such a way that its operating time is smaller than the time constant of said filter.

The invention will be closer described in connection with the enclosed drawing, showing a form of embodiment in accordance with the invention. The circuit arrangement comprises a power regulator or a similar arrangement S, having its input terminal connected with a controlled rectifier D1, connected in series with a resistance R1. The input terminals are moreover connected to the input terminals 1 and 2 of the circuit arrangement via a fuse F1. These input terminals, in their turn, are connected to a power feed source, for example a rectifier set, having a certain internal resistance. The output terminals of the regulator S are connected to a low pass filter comprising the inductance coil L and the capacitor C. The filter is supposed to filtrate the superposed alternating potential. The filter, in its turn, is connected to the output terminals 3 and 4 over a relay Re. The load is connected to these terminals. Between the connection point between the capacitor C and the inductance coil L and the output terminal 3, a current winding 11 of the relay Re is connected, and between the same connection point and the output terminal 4 a voltage winding 10 of the relay Re is connected in series with the Zener diode D2. The relay Re moreover has a make contact connected partly to the ignition electrode of the controlled rectifier D1, partly in series with a resistance R2 to the output terminal 4. The relay Re is preferably of a so called reed relay kind. The windings 10 and 11 are wound in such a way that their magnetic flows have the same direction. The winding 11, that is the current winding, is composed of a few turns of thick wire, and so this winding has a very inconsiderable resistance. The relay is also dimensioned in such a way that its operating time is smaller than the time constant for the filter L, C.

At a normal working the controlled rectifier D1 as well as the Zener diode D2 is non-conducting. The windings 10 and 11 are arranged in such a way that they are not actuated by the normal voltage respectively the normal current in the output circuit. If the current Iut in the output circuit is now increased, the current in the winding 11 is thus also increased. At a fixed value the relay Re operates. At this the ignition electrode of the controlled rectifier D1 is connected over the make contact 12 and over the resistance R2 to the output terminal 4. By this the voltage is brought to the ignition electrode, so that the controlled rectifier D1 becomes conducting, at which the resistance R1 is connected to the input terminals of the regulator. This resistance is chosen to have a low value, of the same size as the internal resistance of the feed source, so that the main part of the current is leaked off through this resistance. After a certain time the fuse F1 breaks the current in the input circuit, so that the regulator becomes free of voltage.

As the current in the output circuit starts increasing, for example at a short-circuiting of the output terminals 3 and 4, this increasing does not take place momentarily to the maximum value on account of the inductance coil L connected in the circuit, that delays the growing of the current. Therefore the operating time of the relay Re should be chosen in such a way that it becomes smaller than the time constant of the filter L, C, so that the controlled rectifier will have time enough to get conducting before the current through L has increased to a value not permitted.

If the voltage in the output circuit increases over the permitted, the voltage over the Zener diode is then increased, at which this one gets conducting provided that the voltage has been increased sufficiently. A current is then obtained through the winding 10 of the relay so that the relay operates. As in the previous case the contact 12 is closed, by which the controlled rectifier D1 gets conducting and then connects the resistance R1. Thereby the fuse F1 gradually melts and the regulator S becomes free of voltage.

By means of the circuit described above a reliable protection against overcurrents and overvoltages is obtained, in its construction comprising a very small number of components, causing a very inconsiderable lose of power and a negligible voltage drop in the main current circuit, supervising the current as well as the voltage and reacting even at errors in the regulator unit itself.

We claim:
1. An arrangement with input and output terminals for protection against overcurrents and overvoltages at a power regulator, to the output of said regulator a low pass filter being connected, between said filter and said output terminals a relay comprising a current winding and a voltage winding being connected, said current winding being connected between the connection point between the coil and the capacitor of said filter and the first of said output terminals, said voltage winding being connected in series with a Zener diode between said connection point and the second of said output terminals, to said input terminals a controlled rectifier in series with a resistance being connected, the ignition electrode of said controlled rectifier in series with a make contact of said relay being connected to said second output terminal, said relay having an operating time less than the time constant of said filter.

References Cited
UNITED STATES PATENTS

| | | | |
|---|---|---|---|
| 1,914,428 | 6/1933 | Hillebrand | 317—16 X |
| 3,177,402 | 4/1965 | Muchnick et al. | 317—33 |
| 3,230,440 | 1/1966 | Kleiner | 317—33 X |

MILTON O. HIRSHFIELD, *Primary Examiner.*

J. D. TRAMMELL, *Assistant Examiner.*